W. NEWELL.
Coffee Cleaner.
No. 24,817.
Patented July 19, 1859.
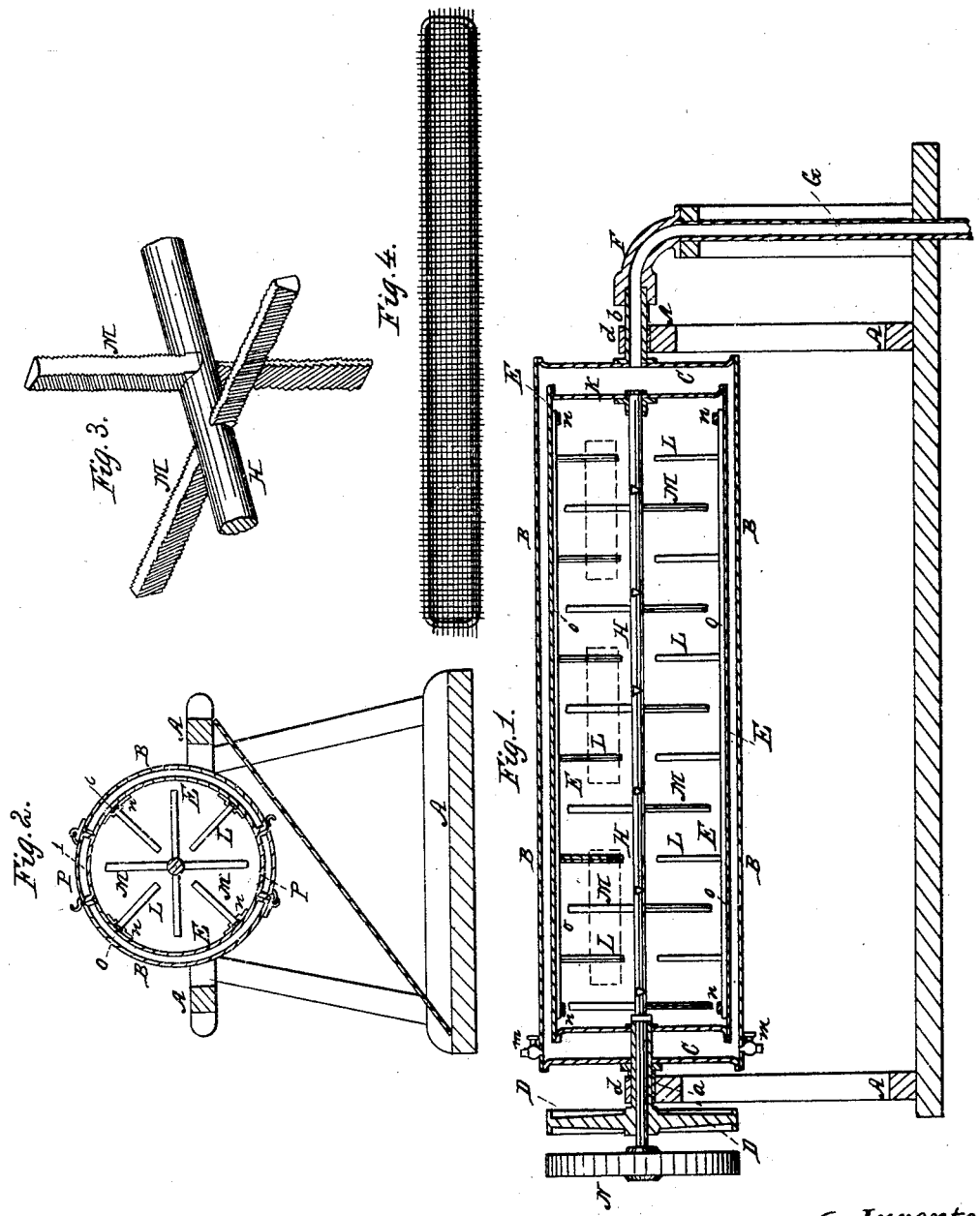
Witnesses:
Inventor:
Wm Newell

UNITED STATES PATENT OFFICE.

WILLIAM NEWELL, OF PHILADELPHIA, PENNSYLVANIA.

MACHINE FOR SCOURING AND POLISHING COFFEE.

Specification of Letters Patent No. 24,817, dated July 19, 1859.

*To all whom it may concern:*

Be it known that I, WILLIAM NEWELL, of Philadelphia, in the county of Philadelphia and State of Pennsylvania, have invented certain new and useful Improvements in Machines for Scouring and Polishing Coffee; and I do hereby declare that the following is a full, clear, and exact description of the construction and operation of the same, reference being had to the accompanying drawings, in which—

Figure 1, represents a longitudinal vertical section through said coffee polishing machine. Fig. 2 represents a vertical cross section through the same. Figs. 3, and 4, represent detached views hereafter to be described.

The nature of my invention relates to the employment of two cylinders, one within the other, and having a steam space between them, said cylinders being armed with proper beaters or polishers, and running in an opposite direction to a center shaft which is armed in a similar manner with beaters for the purpose of polishing coffee, the apparatus to be used with or without steam in the steam space as the nature and condition of the coffee may require.

To enable others skilled in the art to make and use my invention, I will proceed to describe its construction and operation.

A, represents the frame of the machine.

B, represents a hollow cylinder, the heads C, of which are secured respectively to the hollow shaft *a*, and to the hollow journal *b*, which are supported by the journal boxes *d*, of the frame A.

D, represents a pulley which is secured to the hollow shaft *a*, and by which the drum B, can be turned on its axis.

E, represents another drum which is secured within and to the drum B, in such a manner as to leave a space between the two drums for the admission of steam.

The hollow journal *b*, is fitted within the stationary goose neck F, so that it may freely turn therein, while little or no steam will escape through the packing.

G, represents the steam pipe which is fitted into the goose neck F, and by which the steam enters the steam space between the two cylinders.

H, represents a central shaft which has its bearings respectively in the hollow shaft *a*, and in the head K, of the cylinder E, and which can turn freely on said bearings. Both the inside of the cylinder E, and the central shaft H, are armed with beaters L, and M, the cross section of which is of a triangular shape, for presenting more polishing surface, and for turning the grains as they touch them, and which are scarified like a file, as represented in Fig. 3, for the purpose of acting effectually on the coffee to be scoured.

The arms L, of the cylinder E, are secured to the rods *o*, which are held in their places by means of the staples *n*, and which can be withdrawn from their staples when required.

N, represents a pulley which is secured to the shaft H, and by which said shaft is turned on its bearings.

P, represents the hinged doors through which the coffee is fed to and discharged from the machine, these doors are flush with the outside of the cylinder B, while their inner edges are in line with the inner surface of the cylinder E, and the side which closes said cylinder may be made of wire cloth, or of solid metal; in the latter case their cross section is such as represented at 2, in Fig. 2, while 1, in the same figure represents a door wherein one side is made of wire cloth. I use six of these doors, three of which are in line of the cylinder, while the other three are diametrically opposite to the former.

The operation of the machine is as follows—The coffee being fed into the inner cylinder E motion is imparted to the pulleys N, and D, in opposite directions, and the coffee in the cylinder E, is acted upon by the revolutions of the cylinder, while the shaft H, is rotated with great velocity and the rubbing surfaces of the arms L, and M, which are set in alternate position so as to pass each other effectually, clean and polish said coffee; but I only use the machine with two sets of beaters L, M, when the nature and condition of the coffee should require such increased rubbing surface as these two sets of beaters afford by means of their scarified surfaces. If the coffee is of such nature, that it may be polished by the application of a smaller amount of friction, then I withdraw the rods *o*, to which the beaters L are secured from their staples *n*, and place a sieve of the shape as represented in Fig. 4, between each pair of the arms M, and in such a manner that its long edge may rest upon the shaft H, and then perform the operation of cleaning as described. The application of steam depends also on the condition of the coffee as by it, the heat of the apparatus can be increased to any desired degree thus affording the means to operate even on damp coffee without any further difficulties as the temperature of the apparatus can be nicely regulated by admitting more or less steam into the steam space between the cylinders B, and E.

Thus it will be seen that by this apparatus, coffee in its various stages of dryness as well as of quality can be polished and cleaned, and that the machine can be so adjusted as may be required, for working almost any kind of coffee.

The condensed water of the steam can readily be drawn off by opening the cock $m$.

Having thus fully described my invention, what I claim therein as new and desire to secure by Letters Patent, is—

The combination of two cylinders B, and E, having a space between them, with the scarified arms or beaters L, M, moving in contrary directions, substantially in the manner, and for the purpose herein described.

WM. NEWELL.

Witnesses:
JOSEPH KER,
MOSES STARR.